Nov. 22, 1960   H. J. MORAN   2,961,205
RIP CORD HANDLE AND RIP CORD ASSEMBLY
Filed Dec. 21, 1956

INVENTOR
Harold J. Moran
BY
Curtis, Morris & Safford
ATTORNEYS

United States Patent Office 2,961,205
Patented Nov. 22, 1960

2,961,205

RIP CORD HANDLE AND RIP CORD ASSEMBLY

Harold J. Moran, Trenton, N.J., assignor to Switlik Parachute Company, Inc., Trenton, N.J., a corporation of New Jersey Filed Dec. 21, 1956, Ser. No. 629,849

5 Claims. (Cl. 244—149)

This invention relates to a rip cord handle and rip cord assembly.

The principal object of the invention resides in the provision of a rip cord handle and rip cord in which the rip cord may be removed and replaced and wherein the rip cord will be securely attached to the handle in such manner that forces applied to the rip cord will tend to maintain the connection between the handle and the rip cord. Other objects will become apparent as the description of the invention progresses.

In practice, it is ofttimes desirable to remove a used rip cord from a handle and replace it by a new rip cord. This sometimes is required to be done where machines for attaching the two together are not available and yet the new rip cord must be so securely attached to the handle that there will be no possibility of its becoming accidentally detached.

Figure 1:
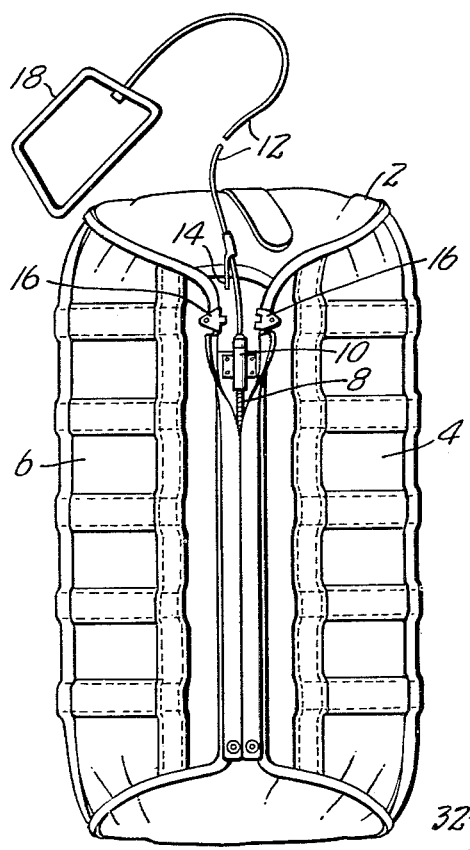
Figure 1 is an elevational view of a parachute pack with the rip cord and handle attached thereto.

In Figure 1 of the drawing, I have illustrated a parachute pack 2, the side flaps 4 and 6 of which are secured together by a zipper type fastener 8, a clip 10 which is carried by the rip cord 12 prevents the disengagement of the zipper elements until it is withdrawn. In this form of pack, the flaps are also secured at the top by a pin 14 which engages in aligned openings in fastener elements 16.

To the end of this rip cord 12, whether it be employed in a pack of the type above briefly described or in other packs where rip cords are used, a handle 18 is secured, which handle is preferably made of a continuous bar to which the rip cord 12 is attached.

Figure 2:
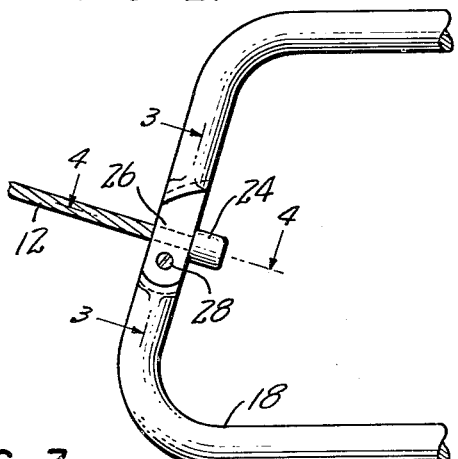
Figure 2 is a fragmentary view showing the attachment of the rip cord to the handle.
Figure 3:
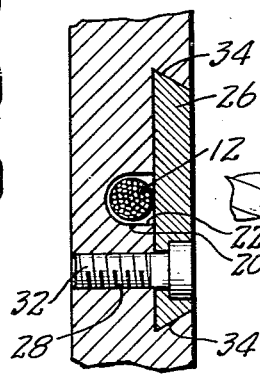
Figure 3 is an enlarged sectional view on line 3—3 of Figure 2.
Figure 4:
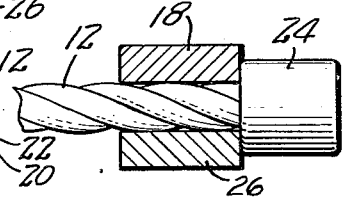
Figure 4 is an enlarged sectional view on line 4—4 of Figure 2.
Figure 7:
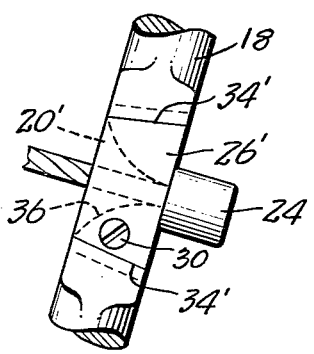
Figure 7 is a sectional view on the plane of line 7—7 of Figure 6.

In the form of the invention illustrated in Figures 2, 3 and 4, the handle 18 is provided with a channel 20 through which the rip cord 12 extends, the channel being open at one of its sides at 22 into a keeper plate receiving recess in the handle to permit the insertion of the rip cord therein.

In order to close this channel 20 so that the rip cord 12 with its head 24 will be maintained therein and consequently in attachment to the rip cord handle, I have provided a closure or keeper plate 26 which is releasably secured to handle 18 on a pivot, such as stud bolt 28 which is in screw threaded engagement at 32 with the handle, thus positioning said plate with its outer face substantially flush with the adjacent outer surface of said handle, as seen in Figure 3.

In this form of the inveniton, the upper and lower edges of the plate 26, as viewed in Figure 3, are chamfered as at 34 in Figure 3 and interengaged with complemental faces provided by undercut grooves at the opposite lateral edges of said keeper plate recess in the handle.

One of the chamfered edges, lower, as seen in Figure 2, is concentric with the axis of the pivot 28, while the other is eccentric having its center of curvature toward the inside of the handle. Thus, when the plate is engaged as shown in Figures 2 and 3, the rip cord will be held within the channel 20 and will be maintained in this channel by the plate 26. Moreover, because of the construction of the plate as described and its position in said recess, any force applied to the plate through the head 24 of the rip cord 12 will tend more tightly to seat the plate.

Figure 5:
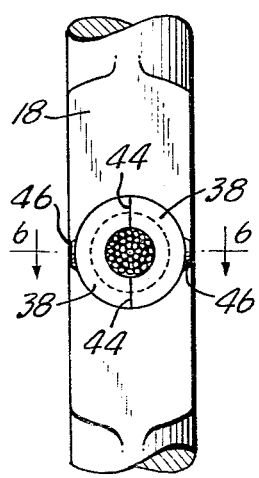
Figure 5 is an elevational view of a portion of a modification of the handle with a portion of the rip cord shown in elevation.

In the form of the invention shown in Figure 5, the channel 20' in handle 18 has outwardly diverging or flared curvilinear faces 36 to permit freedom of swinging movement of the rip cord in relation to the handle.

In this form of the invention, the plate 26' is provided with outwardly converging rectilinear edges 34' and these edges are chamfered as in the previously described form and coact with complemental faces on the handle. In this form of the invention as shown in Figure 5, the rip cord is placed in the channel 20' and the plate 26' secured by the set screw 30 in the position shown in Figure 5 of the drawing.

Figure 6:
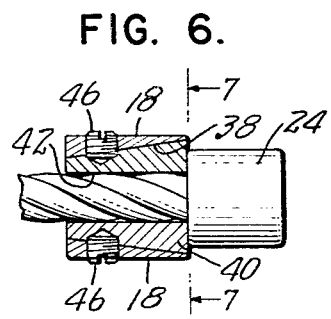
Figure 6 is a sectional view on the plane of lines 6—6 of Figure 7.

In the modification disclosed in Figure 6 of the drawing, the handle 18 is provided with an outwardly tapered bore 38 into which is fitted a channel member 40 which is tapered outwardly from the inside of the handle complemental to the face 38 and is provided with a channel 42 through which the rip cord extends. This channel member 40 is made of two sections, the faces 44 of which abut and extend longitudinally of the channel member. Each of these sections is secured to the handle by set screws 46.

Thus there is provided, in the various forms, an attachment between the rip cord and the rip cord handle of such a character that one or the other may be replaced, and wherein a force applied to the rip cord, as, for instance, when a pull is exerted on the handle to release the pins from the pack, will tend to maintain the attachment between the rip cord and the handle.

It will be understood by those familiar with this art that certain changes may be made within the skill of the art and which will be within the scope of the claims, and I therefore do not wish to be limited, except as is made necessary by the claims, to the particular details of construction disclosed and in this specification described.

I claim:

1. A rip cord and handle combination comprising a handle having a channel therein open at one side, a rip cord extending through said channel and having an abutment on its end within the perimeter of said handle and of greater transverse dimensions than the channel, means operatively engaging said abutment for releasably securing said rip cord in said channel comprising a keeper carried by said handle and extending across said open side of the channel and having faces converging in the direction away from said abutment and bearing on complemental faces on said handle.

2. The combination of elements recited in claim 1 wherein said keeper is comprised by a plate attached to said handle by a screw device.

3. A rip cord and handle assembly comprising a rip cord having an abutment secured at its free end, and a handle to which said free end of the cord is releasably attached, said handle having a channel of less crosssectional area than that of the abutment and open at one side to receive a portion of said free end of the cord adjacent to said abutment, and having a recess arranged at both sides of said channel and provided with an undercut groove at one of its lateral edges, said recess being narrower at its outer end than at its inner end, and a tapered keeper plate beveled at one of its lateral edges and narrower at its outer end than at its inner end and arranged and adapted to be inserted and held in said recess with said beveled edge portions engaging said undercut groove and in cord retaining relation to said channel, and means operatively arranged in relation to said handle and said keeper plate to releasably secure the latter in operative cord retaining position in said recess whereby said plate is adapted to be engaged by said abutment and to limit outward movement thereof and of the cord in relation to said channel.

4. Rip cord assembly according to claim 3 and wherein the channel is flared to provide a larger opening at its outer end than that at its inner end whereby the rip cord is permitted limited angular movement of its free end portion within said channel.

5. Rip cord assembly according to claim 3 and wherein the keeper plate is retained in the recess by means providing a pivot at one side of said channel, and said plate and said recess are arranged and adapted to permit angular movement of said plate around said pivot in a direction to release the cord, and to prevent angular movement of the plate in the opposite direction when the plate is in operative cord retaining relation to said channel.

References Cited in the file of this patent

UNITED STATES PATENTS

| | | |
|---|---|---|
| 749,898 | Fowler | Jan. 19, 1904 |
| 862,197 | Pryor | Aug. 6, 1907 |
| 1,258,580 | Lassiter | Mar. 5, 1918 |
| 1,443,745 | Holt | Jan. 30, 1923 |
| 1,459,984 | Nelson | June 26, 1923 |
| 2,136,861 | Norris | Nov. 15, 1938 |
| 2,335,810 | Stalkup | Nov. 30, 1943 |
| 2,398,692 | Bratz | Apr. 16, 1946 |
| 2,763,451 | Moran | Sept. 18, 1956 |
| 2,840,327 | Stanley | June 24, 1958 |
| 2,846,162 | Allin et al. | Aug. 5, 1958 |